United States Patent [19]

Goodell et al.

[11] Patent Number: 4,709,738
[45] Date of Patent: Dec. 1, 1987

[54] BEAD LOCK FOR PNEUMATIC TIRES
[75] Inventors: Fred L. Goodell, Grosse Ile; Michael J. Ellison, Canton, both of Mich.
[73] Assignee: AM General Corporation, Livonia, Mich.
[21] Appl. No.: 829,198
[22] Filed: Feb. 14, 1986
[51] Int. Cl.$^4$ .............................................. B60C 17/00
[52] U.S. Cl. ..................................... 152/400; 152/516
[58] Field of Search .............. 152/399, 400, 401, 158, 152/516, 517, 518, 519

[56] References Cited
U.S. PATENT DOCUMENTS

| | | | |
|---|---|---|---|
| 1,889,799 | 12/1932 | Clark | 152/400 X |
| 2,399,572 | 4/1946 | Powell et al. | 152/400 |
| 3,935,892 | 2/1976 | Arimura et al. | 152/400 X |
| 4,008,743 | 2/1977 | Welch | 152/400 X |

FOREIGN PATENT DOCUMENTS

| | | | |
|---|---|---|---|
| 139275 | 11/1947 | Australia | 152/518 |
| 2074955 | 11/1981 | United Kingdom | 152/518 |

Primary Examiner—David A. Scherbel
Attorney, Agent, or Firm—Brooks & Kushman

[57] ABSTRACT

A bead lock for locking the bead portion of a pneumatic tire against the outer periphery of a vehicle wheel is adapted to seat in the vehicle wheel. In a first embodiment, the bead lock includes first and second annular members. The first annular member includes an endless band of aeromatic polyamide fibers. The second annular member has radially inner and outer portions and interconnecting resilient side portions. The first annular member is received and retained within a circumferentially extending slot formed in one of the outer portions to urge the side portions against the bead portions of the tire. The second embodiment includes a pair of locking rings, a pair of resilent sealing rings and a clamping mechanism for selectively clamping the locking and sealing rings and the bead portions together against the outer periphery of the wheel. In a third embodiment, the bead lock includes a pair of endless bands of aeromatic polyamide fibers embedded within an inflatable annular member having radially inner and outer portions and interconnecting side portions. The inner and outer portions comprise a matrix in which the bands are embedded. In all three embodiments each bead lock prevents displacement of the bead portion of the tire from the outer periphery of the wheel in the event of a partial or total deflation of the tire.

4 Claims, 11 Drawing Figures

BEAD LOCK FOR PNEUMATIC TIRES

TECHNICAL FIELD

This invention relates to bead locks for locking the bead portions of a pneumatic tire against the outer periphery of a vehicle wheel to prevent displacement of the bead portions from the outer periphery of the wheel in the event of a partial or total deflation of the tire.

BACKGROUND ART

It is well known that the traction of vehicles on soft terrain such as sand, mud and snow may be greatly improved by decreasing the pressure within the pneumatic tires on which the vehicles ride. By decreasing the pressure, the tire supporting surface will increase, thereby enlarging the contact area between the tires and the terrain.

Additionally, it is often desirable to decrease tire pressure to increase riding comfort on rough roads and to accommodate low strength road systems as well as off-road surface variances. For example, low tire inflation pressure enhances the mobility of military amphibious vehicles as well as high-speed, high mobility military vehicles. Operation at such relatively low tire inflation pressures improves off-highway vehicle performance, durability, reliability and reduced life cycle operating costs. Consideration of these costs not only includes the condition of the driver, vehicle and cargo but also the roads over which the vehicles travel.

One problem in operating pneumatic tires at such low operating pressures is that the beads of the pneumatic tire tend to separate from the wheel rim. One solution to this problem is to provide bead locks which lock the tire beads to the wheel rim to retain a minimal air pressure in the tire cavity so that the vehicle can operate in such difficult terrain. Some bead locks also function as a limited run-flat mechanism.

One such tire support system or bead lock is described in U.S. Pat. No. 4,383,566. The bead lock includes material which expands due to heat caused by a flat condition to support the tire in normal configuration until repairs can be effected. The bead lock provides initial support to prevent sidewall damage due to flexing and prevents the beads from falling into the wheel well by swelling to fill the cavity. There is no contact in normal tire operation with either sidewall or inner tread surface.

The U.S. Pat. No. 632,028 to Smith discloses an annular fastening band which seats in the central groove of a wheel rim and serves to bind or clench the casing of the tire into abutment with the wheel rim. The fastening band uses strengthening rods which join at diametrically opposed locking ends.

The U.S. Pat. Nos. 1,652,146 and 1,653,147 to Michelin disclose the use of arcuate plates in conjunction with a wheel rim to secure the bead lock.

The U.S. Pat. No. 4,078,597 to Noda discloses an inflatable tubular ring disposed in the central well of the wheel to secure the bead lock.

The U.S. Pat. No. 4,122,882 to Fisher et al discloses an obstructor band which includes upstruck lugs to maintain the tire bead in abutting relation with the wheel rim.

A first U.S. Pat. No. 4,304,282 to Watts discloses a blocking member which is mounted for movement between first and second positions within the wheel drop center.

A second U.S. Pat. No. 4,374,535 to Watts discloses a wheel well filler which seats or mounts in the well of the wheel to prevent removal of the tire beads over the side flanges during operation of the tire in a deflated condition. The filler is molded from a flat, resilient, flexible material. The filler is reinforced by a steel wire cable molded integrally with the filler. A hook and eye latch locks the filler in position in the wheel well.

The U.S. Pat. No. 4,391,317 to Savage discloses a band which has box section legs spaced on its interior surface. The band device mounts in the drop center of the wheel.

DISCLOSURE OF THE INVENTION

An object of the present invention is to provide an improved bead lock for locking the bead portions of a pneumatic tire against the outer periphery of a vehicle wheel and being adapted to seat in the vehicle wheel.

Another object of the present invention is to provide an improved bead lock for locking the bead portions of a pneumatic tire against the outer periphery of a vehicle wheel and is capable of adjustment in the field.

Yet still another object of the present invention is to provide an improved bead lock for locking the bead portions of a pneumatic tire against an outer periphery of a vehicle wheel wherein in two embodiments of the invention a band of aeromatic polyamide fibers is utilized as a support.

In carrying out the above objects and other objects of the present invention, a bead lock is provided which comprises a first annular member including an endless band of aeromatic polyamide fibers and a second annular member having radially inner and outer portions and interconnecting resilient side portions. The first annular member is received and retained within a circumferentially extending slot formed in one of the inner and outer portions to urge the side portions against the bead portions of the tire when seated in the wheel.

Further in carrying out the above objects and other objects of the present invention a bead lock is provided which comprises a pair of locking rings, a pair of resilient sealing rings and clamping means for selectively clamping the locking and sealing rings and the bead portions together against the outer periphery of the wheel.

Yet still further in carrying out the above objects and other objects of the present invention a bead lock is provided which comprises at least one endless band of aeromatic polyamide fibers and an inflatable annular member having radially inner and outer portions and interconnecting side portions. The annular member comprises a matrix in which the band is embedded. When the annular member is inflated, the side portions prevent the bead portions of the tire from being displaced from the outer periphery of the wheel in the event of partial or total deflation of the tire.

In two of the disclosed embodiments, the endless band of aeromatic polyamide fibers is preferably of the type as sold by E. I. duPont de Nemours & Co. (Inc.) of Wilmington, Del., United States of America under its registered U.S. Trademark, Kevlar. Such Kevlar fibers are sold as yarn, cloth woven from the yarn and stable fibers in the form of felt.

In the two embodiments, each of the endless bands comprises cloth woven from such Kevlar fibers after the fibers are first made into yarn. The Kevlar cloth has a generally rectangular cross section with a greater width than height to provide a relatively large area of support. In other words, there is a greater width between the sides of the Kevlar cloth than the height between inner and outer surfaces.

In the third embodiment, preferably rubber sealing rings are provided which seal against the bead portions. By making the sealing rings from rubber, there is less tendency that the bead portion of the vehicle tire will take a set as often occurs if such sealing rings are non-yielding. When the bead portions take a set, there is a tendency for the pneumatic pressure to escape between the bead portions and the sealing rings.

The advantages accruing to the use of such bead locks as constructed above are numerous. For example, such bead locks can be employed in conventional vehicle wheels without special redesign. Also such bead locks can be adjusted to seat in the vehicle wheel in the field rather than having to return the vehicle to a service center. Such beads locks can prevent the bead portions of the tire from being displaced from the outer periphery of the wheel in the event of a partial or total deflation of the tire by utilizing a relatively inexpensive construction.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
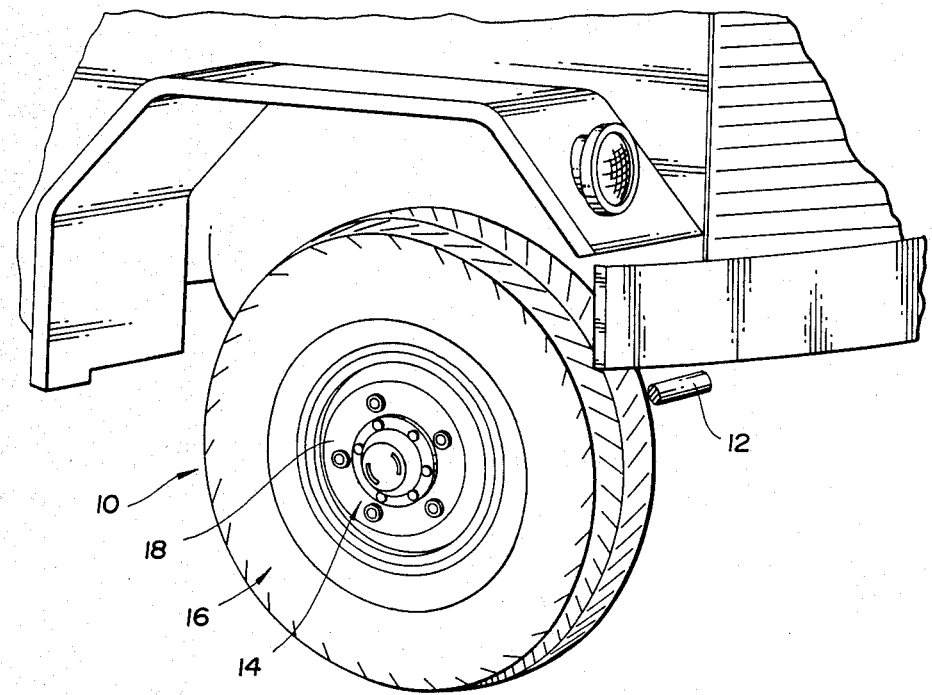
FIG. 1 is a perspective environmental view of a wheel assembly including a vehicle wheel in which a bead lock made in accordance with the invention is adapted to seat.

Referring to FIG. 1 of the drawings, the present invention finds particular utility in connection with a vehicle, collectively indicated at 10, which may comprise a cargo truck built for the U.S. Army by AM General Corporation, the assignee of the present application. While the present invention is particularly useful for use with cargo trucks, the invention can also be used in other types of vehicles such as busses, utility trucks and the like.

A portion of the vehicle 10 is shown, including a front axle 12 which drives a wheel assembly, generally indicated at 14, onto which a tire, generally indicated at 16, is mounted.

Figure 2:
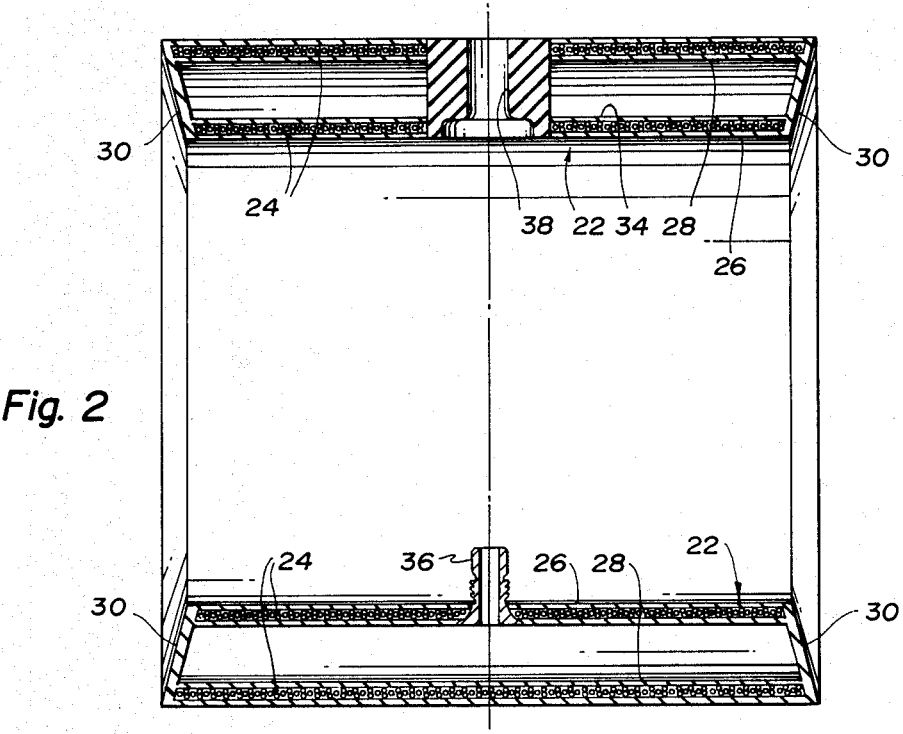
FIG. 2 is a sectional view of one embodiment of a bead lock constructed in accordance with the present invention.
Figure 3:
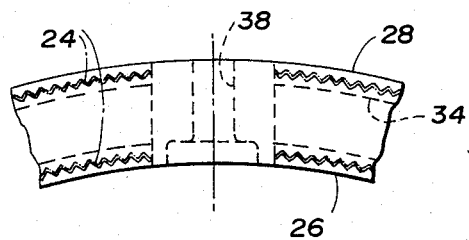
FIG. 3 is a side elevational view, partially broken away, of the bead lock with passages and fibers extending therethrough indicated by phantom lines.
Figure 3:
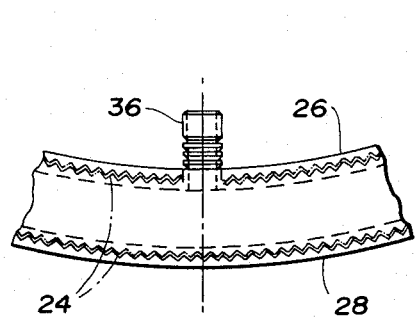
Figure 4:
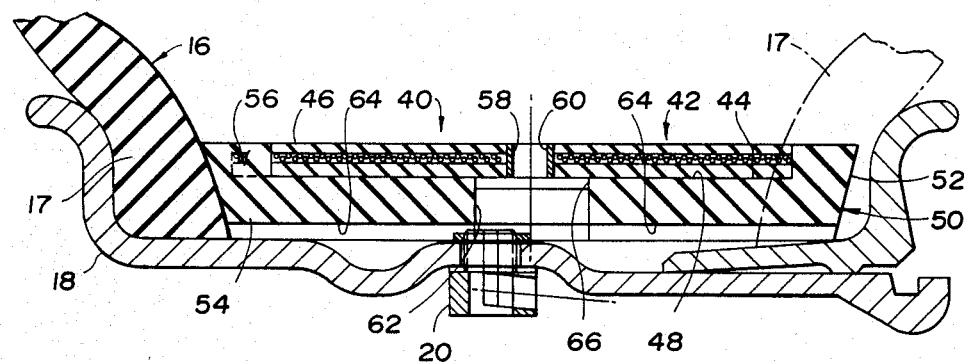
FIG. 4 is a sectional view, partially broken away, of a second embodiment of the bead lock constructed in accordance with the present invention.
Figure 5:
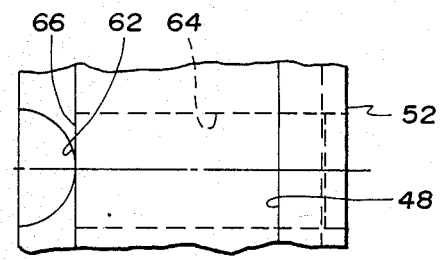
FIG. 5 is a top plan view, partially broken away, of one half of a second annular member.
Figure 6:
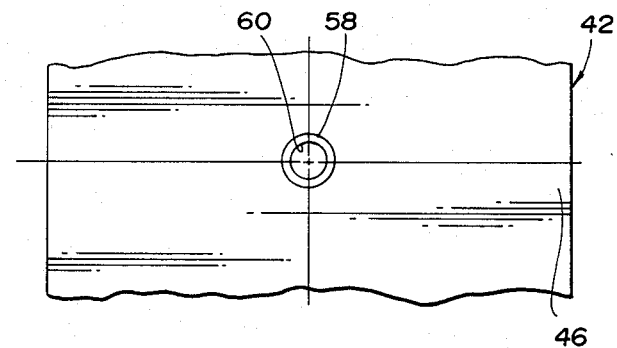
FIG. 6 is a top plan view, partially broken away of the first annular member.
Figure 7:
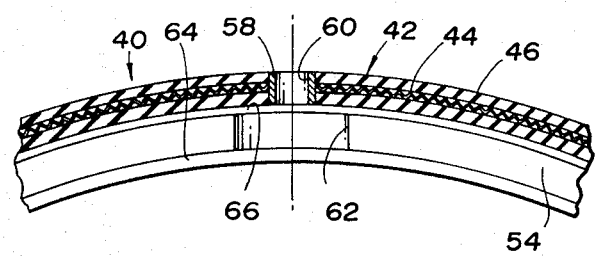
FIG. 7 is a side elevational view, partially broken away and in cross section of the first and second annular members.
Figure 8:
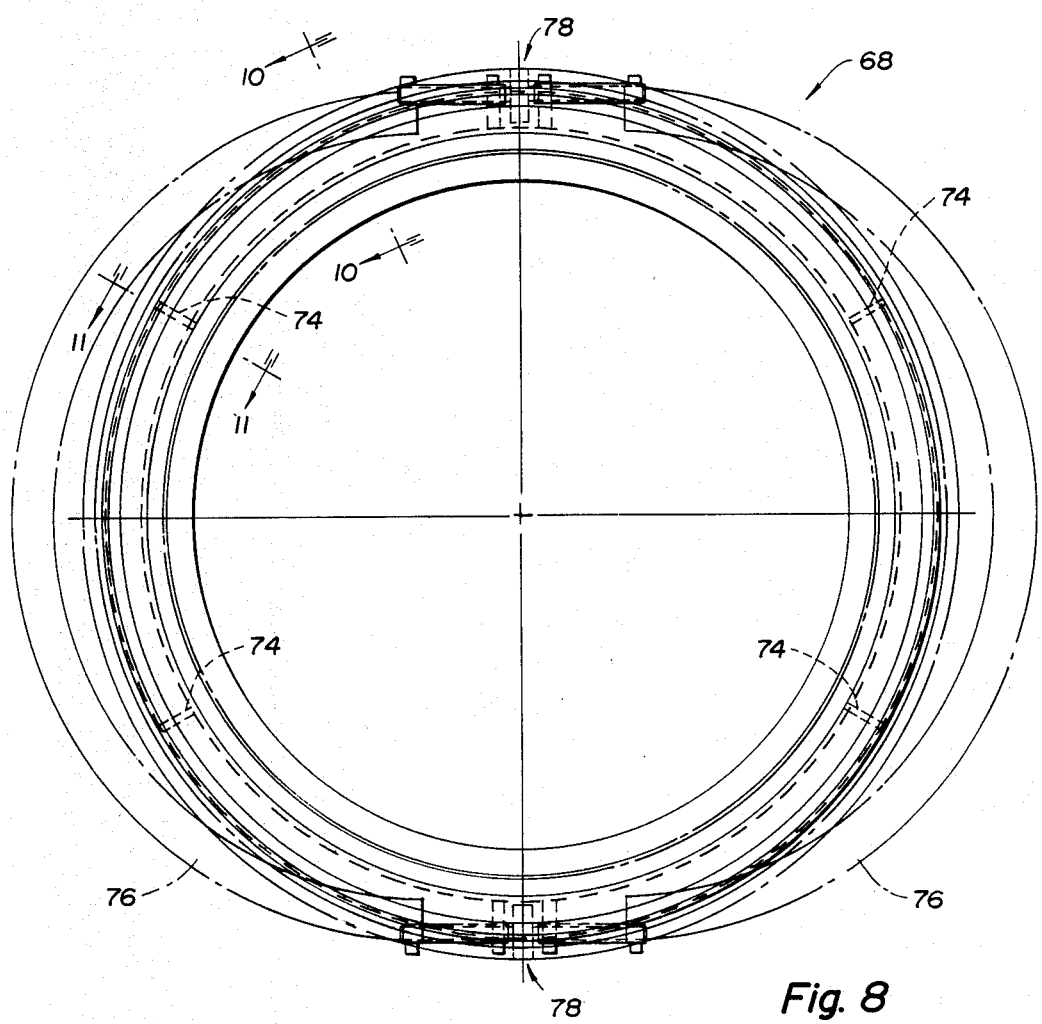
FIG. 8 is a side elevational view of a third embodiment of a bead lock constructed in accordance with the present invention shown in clamped and unclamped positions.
Figure 9:
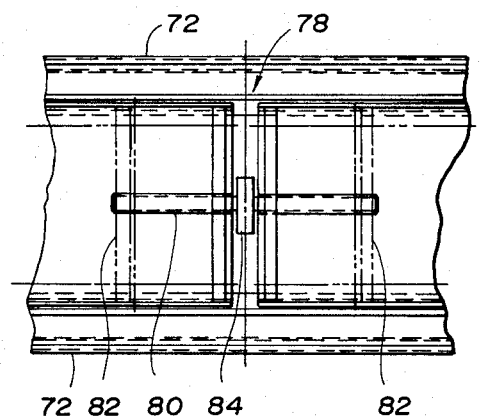
FIG. 9 is a top plan view, partially broken away, illustrating an adjusting mechanism for moving the bead lock between its clamped and unclamped positions.
Figure 10:
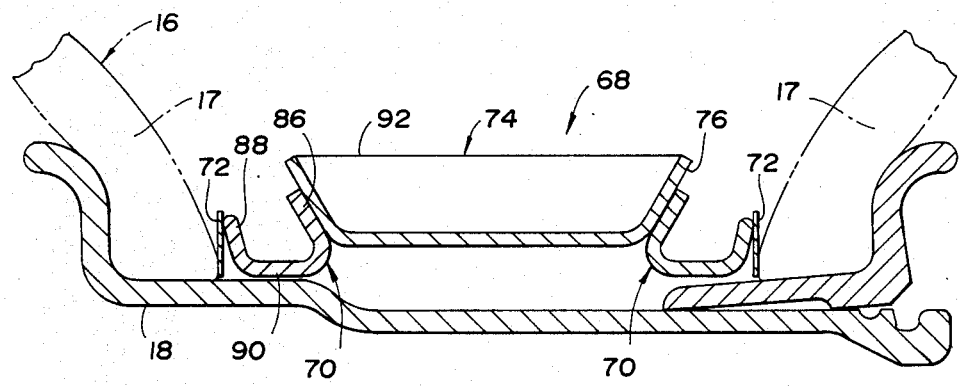
FIG. 10 is a cross-sectional view, taken along lines 10—10 of FIG. 9, showing the bead lock in its unclamped or unlocked position.
Figure 11:
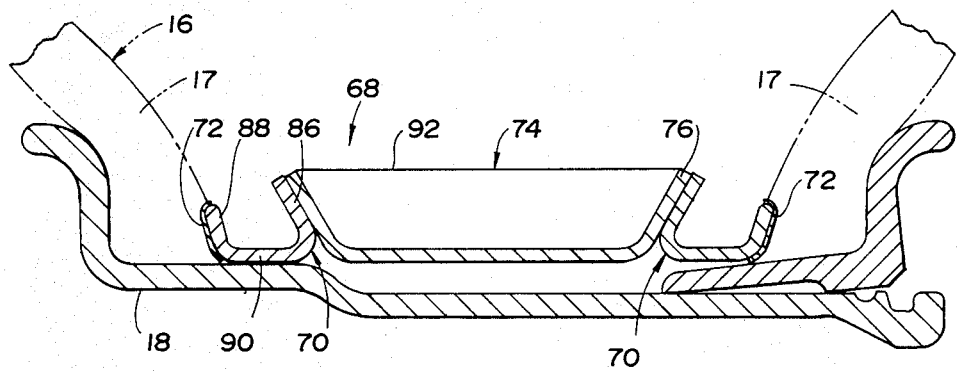
FIG. 11 is a cross-sectional view, taken along lines 11—11 of FIG. 9, showing the bead lock in its locked or clamped position.

Referring now to FIGS. 2 and 3, there is generally indicated at 22 a first embodiment of a bead lock for locking the bead portions 17 of the pneumatic tire 16 against the outer periphery of the vehicle wheel 18. As illustrated in FIGS. 4, 10, and 11, the vehicle wheel 18 preferably comprises a two-piece wheel assembly, including an air line fitting 30 if used in combination with a central tire inflation system. However, the wheel 18 may also comprise a single piece or three or more separate pieces.

The bead lock device 22 includes an inflatable, annular member 22 which comprises a matrix for a pair of spaced, endless bands 24 of aeromatic polyamide fibers. The annular member 22 preferably comprises a vulcanized synthetic rubber. The bands 24 comprisee a woven cloth of Kevlar fibers. Such fibers are sold by the E. I. duPont deNemours & Co. (Inc.) of Wilmington, Del. United States of America, under its registered trademark, Kevlar.

The annular member 22 includes inner and outer portions 26 and 28, respectively, and interconnecting side portions 30. When the annular member 22 is inflated, the side portions 30 prevent the bead portions 17 of the tire 16, as shown in FIG. 4, from being displaced from the outer periphery of the wheel 18 in the event of partial or total deflation of the tire 16.

The inner and outer Kevlar bands 24 are embedded in the inner and outer portions 26 and 28, respectively. Because the inner portion 26 is adapted to engage the vehicle wheel 18 when inflated, the inner Kevlar band 24 may be omitted without departing from the scope of the present invention.

The inflatable member 22 includes a cavity 34 extending substantially circumferentially within the inflatable member 22. The inflatable member 22 also includes a metal valve 36 through which pneumatic medium, such as air, is adapted to be supplied into the cavity 34 to inflate the inflatable member 22. The inflatable member 22 is formed with an aperture 38 which is adapted to receive and retain therein an inlet valve stem of the tire 16 to permit inflation of the tire.

Referring now to FIGS. 4 through 7, there is illustrated a second embodiment of a bead lock device, generally indicated at 40. The bead lock device 40 includes a first annular member, generally indicated at 42, having an endless band of Kevlar cloth covered with a rubber covering 46.

The first annular member 42 is received and retained within a circumferentially extending slot 48 formed in the second annular member, generally indicated at 50. The second annular member 50 preferably comprises first and second complimentarily formed annular rubber parts 52 and 54 which together define the circumferentially extending slot 48 in their outer surface thereof.

As shown in FIG. 4, the first annular part 52 is shown in its unstressed position and the second annular part 54 is shown in its stressed condition, a portion of which is broken away at 56.

The first annular member 42 includes a bushing 58 bonded thereto which defines an aperture 60 extending completely therethrough. The aperture 60 is aligned with a second aperture 62 which is defined by the two annular parts 52 and 54 to permit the flow of pneumatic medium through the airline fitting 20 to inflate the pneumatic tire 16. Slots 64 are formed in the inner surface of each of the first and second annular parts 52 and 54 to permit the parts 52 and 54 to be slid over the air fitting 20. An additional slot 66 is also formed by the first and second annular parts 52 to facilitate the flow of air between the aperture 60 and the aperture 62.

Referring now to FIGS. 8 through 11, there is illustrated a third embodiment of a bead lock assembly, generally indicated at 68. The bead lock assembly 68 includes a pair of spaced steel locking rings, generally indicated at 70, a pair of rubber sealing rings 72 and a clamping mechanism, generally indicated at 74. The clamping mechanism 74 selectively clamps and locks the sealing rings 72, the locking rings 74 and the bead portions 13 of the tire 16 against the outer periphery of the wheel 18.

The clamping mechanism 21 includes a pair of metal half bands 76, adjacent ends of which may be adjustably drawn together or apart by a pair of screw assemblies, each of which is generally indicated at 78. Each screw assembly 78 includes a rod mounted at its end portions to the ends of the half bands 76 at struts 82. The end portions of each rod 80 are threaded in opposite directions so that a thumbwheel 84 centrally mounted on the rod 80 to rotate therewith, alternately causes the ends of the half bands 76 to either move together or apart.

The half bands 76 comprise an inextensible material so that an adjusting mechanism which preferably comprises the screw assemblies 78 can adjust the effective circumferential length of the half bands 76.

Each of the locking rings 70 includes inner and outer side portions 86 and 88 and an interconnecting portion 90 integrally formed with the inner and outer side portions 86 and 88. Each of the sealing rings 72 is adhesively bonded on one side thereof to its respective side portion 88 and sealed against a bead portion 17 on its opposite side thereof in a clamped position of the clamping mechanism 74 as best shown in FIG. 11.

Struts 92 extend between the side walls of each of the half bands 76 at circumferentially spaced positions to provide structural strength to the half bands 76.

The advantages accruing to the bead lock as exemplified by the three embodiments of the present invention are numerous. For example, the various constructions are effective, yet relatively inexpensive to prevent the bead portions 17 of the tire 16 from being displaced from the outer periphery of the wheel 18 in the event of a partial or total deflation of the tire.

Also, the bead locks have a construction which permit personnel in the field to adjust the bead locks within their respective wheels without the need to return the entire vehicle to a service center.

While the best modes for carrying out the invention have herein been described in detail, those familiar with the art to which this invention relates will recognize various alternative designs and embodiments for carrying out the invention as defined by the following claims.

What is claimed is:

1. A device for locking the bead portions of a pneumatic tire against the outer periphery of a vehicle wheel and being adapted to seat in the vehicle wheel, the device comprising:

at least one endless inextensible band;

an inflatable annular member having radially inner and outer portions and interconnecting side portions, said outer portion comprising a matrix in which said band is embedded; wherein said inflatable member is formed with a cavity extending substantially circumferentially therein and includes a valve through which pneumatic medium is adapted to be supplied into said cavity to inflate said inflatable member; and means defining an aperture extending radially completely therethrough said inner and outer portions and said band to communicate the inner and outer portions, said means extending completely between said inner and outer portions within said cavity to prevent communication of pneumatic medium between the cavity and the aperture; said side portions, when said annular member is inflated, preventing the bead portions of the tire from being displaced from the outer periphery of the wheel in the event of a partial or total deflation of the tire and said band preventing radial expansion of said outer portions.

2. The device as claimed in claim 1 wherein said band includes a band of aeromatic polyamide fibers.

3. The device as claimed in claim 2 wherein the band has a generally rectangular cross-section with a width greater than the height.

4. The device as claimed in claim 1 including a pair of bands wherein said bands are radially spaced in said inner and outer portions on opposite sides of said cavity.

* * * * *